US011100314B2

(12) United States Patent
Protter et al.

(10) Patent No.: US 11,100,314 B2
(45) Date of Patent: Aug. 24, 2021

(54) DEVICE, SYSTEM AND METHOD FOR IMPROVING MOTION ESTIMATION USING A HUMAN MOTION MODEL

(71) Applicant: Alibaba Technology (Israel) Ltd., Herzliya (IL)

(72) Inventors: Matan Protter, Kiryat Ono (IL); Efrat Rotem, Haifa (IL)

(73) Assignee: Alibaba Technologies (Israel) LTD., Herzliya (IL)

( * ) Notice: Subject to any disclaimer, the term of this patent is extended or adjusted under 35 U.S.C. 154(b) by 0 days.

(21) Appl. No.: 16/641,233

(22) PCT Filed: Nov. 6, 2018

(86) PCT No.: PCT/IL2018/051179
§ 371 (c)(1),
(2) Date: Feb. 22, 2020

(87) PCT Pub. No.: WO2019/092698
PCT Pub. Date: May 16, 2019

(65) Prior Publication Data
US 2020/0226357 A1 Jul. 16, 2020

Related U.S. Application Data

(60) Provisional application No. 62/584,257, filed on Nov. 10, 2017.

(51) Int. Cl.
*G06K 9/00* (2006.01)
*G06T 7/277* (2017.01)
*G06T 19/00* (2011.01)

(52) U.S. Cl.
CPC .......... *G06K 9/00342* (2013.01); *G06T 7/277* (2017.01); *G06T 19/00* (2013.01);
(Continued)

(58) Field of Classification Search
CPC ..... G06K 9/00342; G06T 7/277; G06T 19/00; G06T 2207/10016; G06T 2207/20081;
(Continued)

(56) References Cited

U.S. PATENT DOCUMENTS

| 2007/0216675 A1* | 9/2007 | Sun ........................ G06T 11/00 345/419 |
| 2011/0256914 A1* | 10/2011 | Ahdoot ................. A63F 13/833 463/8 |

(Continued)

OTHER PUBLICATIONS

Tanaya et al, ("Learning Sparse Representations for Human Action recognition", IEEE Transactions on pattern analysis and machine intelligence, vol. 34, No. 8, Aug. 2012, pp. 1576-1587) (Year: 2012).*

*Primary Examiner* — Amara Abdi
(74) *Attorney, Agent, or Firm* — Pearl Cohen Zedek Latzer Baratz LLP

(57) ABSTRACT

A device, system and method is provided for estimating movement based on a human movement model in a virtual, augmented or mixed reality environment. In an offline phase, a human movement model may be stored that assigns a non-uniform probability of spatiotemporal representations of movements that occur in a human body. In an online phase, a user's movements may be recorded. The user's movements may be estimated by spatiotemporal representations of a plurality of (N) degrees of freedom (DOF) that maximize a joint probability comprising a first probability that the measured movements match the estimated movements and a second probability that the human movement model assigns to the spatiotemporal representations of the estimated movements. A virtual, augmented or mixed reality image may be displayed that is rendered based on the NDOF spatiotemporal representations of the estimated movements.

20 Claims, 3 Drawing Sheets

(52) U.S. Cl.
CPC .............. *G06T 2207/10016* (2013.01); *G06T 2207/20081* (2013.01); *G06T 2207/30196* (2013.01)

(58) Field of Classification Search
CPC . G06T 2207/30196; G06T 2207/20084; G06T 2207/20076
See application file for complete search history.

(56) References Cited

U.S. PATENT DOCUMENTS

| | | | | |
|---|---|---|---|---|
| 2012/0299828 | A1* | 11/2012 | Grokop | G06F 3/017 345/158 |
| 2013/0006577 | A1* | 1/2013 | Mathews | G01S 13/726 702/150 |
| 2013/0191908 | A1* | 7/2013 | Klein | H04W 12/069 726/18 |
| 2013/0271458 | A1* | 10/2013 | Andriluka | G06T 7/55 345/420 |
| 2017/0136296 | A1 | 5/2017 | Barrera et al. | |
| 2017/0238055 | A1* | 8/2017 | Chang | G06F 3/013 725/19 |

* cited by examiner

__US 11,100,314 B2__

DEVICE, SYSTEM AND METHOD FOR IMPROVING MOTION ESTIMATION USING A HUMAN MOTION MODEL

CROSS-REFERENCE TO RELATED APPLICATIONS

This application is a National Phase Application of PCT International Application No. PCT/IL2018/051179, International Filing Date Nov. 6, 2018, which claims priority to U.S. Provisional Patent Application No. 62/584,257, filed Nov. 10, 2017, both of which are incorporated herein by reference in their entirety.

This application claims priority to U.S. Provisional Patent Application No. 62/584,257, filed Nov. 10, 2017, which is incorporated herein by reference in its entirety.

FIELD OF THE INVENTION

Embodiments of the invention relate to the field of motion estimation. In some embodiments, motion estimation may be used to track or predict user movements in virtual reality, augmented reality and/or mixed reality systems.

BACKGROUND OF THE INVENTION

A main challenge in virtual reality (VR), augmented reality (AR) and/or mixed reality (MR) environments is calculating user movements with sufficient speed and precision to simulate virtual images that realistically appear to be rendered from a user's point of view. In order to achieve a realistic user experience, the head and overall user movements should be calculated accurately and in real-time.

Virtual reality (VR), augmented reality (AR) and/or mixed reality (MR) systems simulate graphics based on a user's movements, such as, head position, line of eyesight, and/or body position, and/or user hand or palm movement. Movement tracking is based on measurements recorded by sensors such as cameras, gyroscopes and/or accelerometers affixed to the user's head, hand and/or other body parts, or by external sensors or imagers with the user in its field of view. Some systems use the user's current motion estimates or dynamics to predict future motions to account for a computational delay between the time a user movement is measured and the time the corresponding image is rendered and displayed to a user.

Motion estimation however involves complex and time-consuming calculations that analyzes all possible candidate motions, e.g., in six degrees of freedom. The time and computational burden of current motion estimators introduces significant latency referred to as "motion-to-photon" latency, which is the delay between an initial head movement to the time the corresponding image is displayed to the user. Motion-to-photon latency gives the appearance of delayed graphic response to head motion and minimizing such latency is a universal goal in VR, AR and MR systems. Further, current motion estimators yield errors, which grow exponentially with latency.

There is therefore a need in the art for decreasing the time and latency of motion estimation calculations and improving motion estimation accuracy.

SUMMARY OF EMBODIMENTS OF THE INVENTION

Some embodiments of the invention overcome the aforementioned problems inherent in the art by decreasing the time and latency of motion estimation calculations and/or improving motion detection, estimation and prediction accuracy.

In an embodiment of the invention, a device, system and method is provided for estimating movement based on a human movement model in a virtual, augmented or mixed reality environment. In an offline phase, a human movement model may be stored that assigns a non-uniform probability of spatiotemporal representations of movements that occur in a human body. In an online phase, a user's movements may be recorded. The user's movements may be estimated by spatiotemporal representations of a plurality of (N) degrees of freedom (DOF) that maximize a joint probability comprising a first probability that the measured movements match the estimated movements and a second probability that the human movement model assigns to the spatiotemporal representations of the estimated movements. A virtual, augmented or mixed reality image may be displayed that is rendered based on the NDOF spatiotemporal representations of the estimated movements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
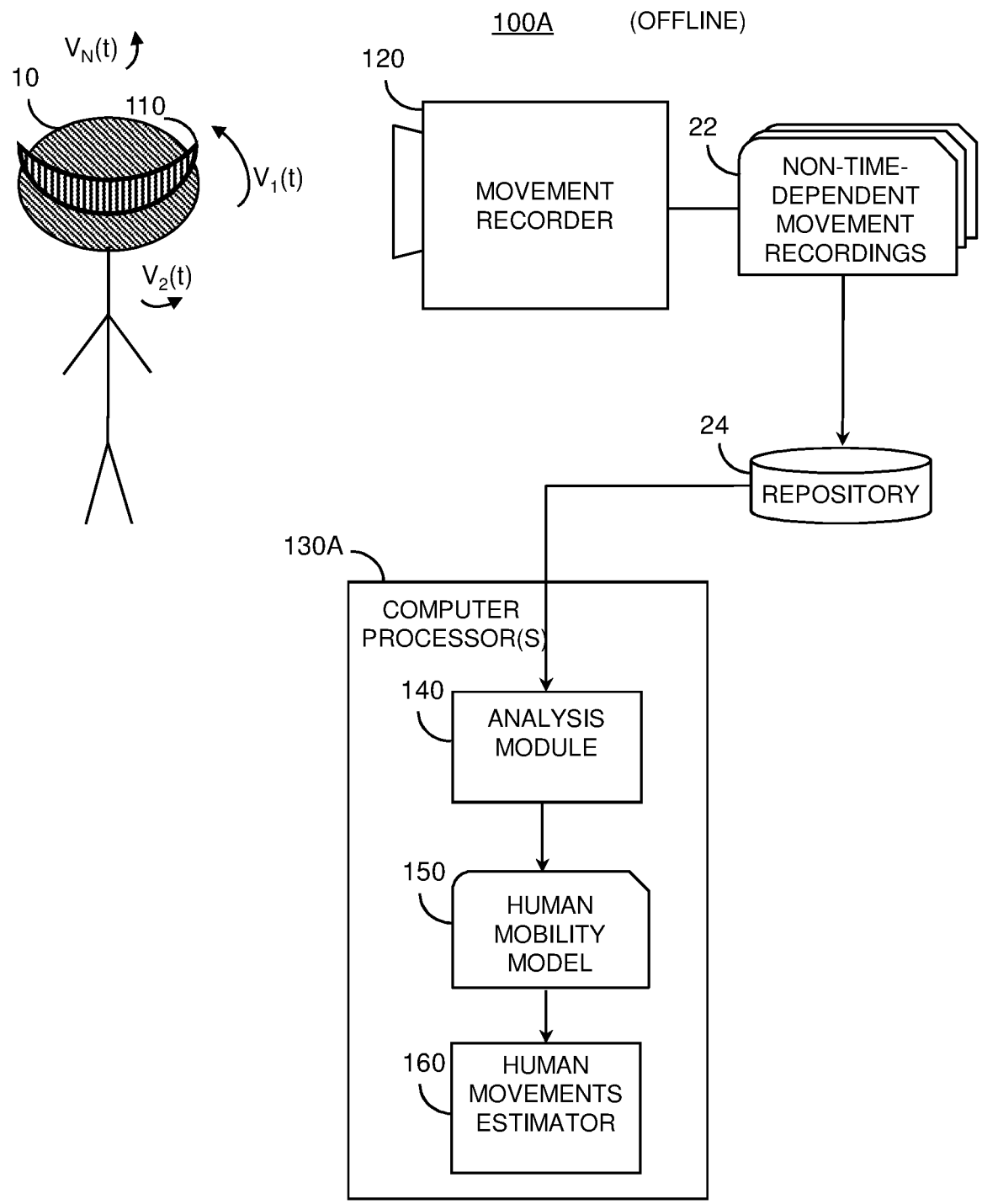
FIG. 1A is a schematic illustration of an example system for training a motion estimator to model human motion in an offline phase, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

According to some embodiments of the invention, a virtual, augmented or mixed reality device, system or method may estimate motion based on a human movement model in a virtual, augmented or mixed reality environment. A human movement model may be generated and/or stored that defines a non-uniform probability of spatiotemporal representations of a plurality of movements corresponding to a non-uniform probability that the plurality of movements occurs in a human body. The human motion model may represent a non-uniform distribution favoring certain common movements (e.g., a head moving at small angles from side-to-side) as having a permitted or relatively high or above threshold probabilities, and disfavoring other rare or impossible movements (e.g., the head rotating 180°) as having a prohibited or relatively low or below threshold model probabilities. A motion estimation model may only analyze or estimate candidate motions that agree with the human motion dataset, and discard or ignore candidate motions that do not agree. In some embodiments, the motion estimation model may transform an impermissible or below threshold probability motion into a permissible or above threshold probability motion (e.g., most similar acceptable NDOF to the impermissible motion).

During runtime, a VR, AR or MR device may use the human movement model (with a non-uniform or preferential probability of various motions) to optimize a motion estimate or to correct or improve an initial motion estimate (based on no model or a uniform probability of all motions). The device may receive movement recordings from one or more movement recorders that measure movements of a user. Each movement recording may be associated with an initial spatiotemporal representation of a plurality of (N) degrees of freedom (DOF) of the movement. An NDOF measurement may refer to a single NDOF reading at a single time (representing static movement such as position), or a function such as a change or derivative of multiple NDOF measurements at multiple times (representing dynamic movement such as speed or rotation), or a partial subset of the N degrees of freedom (e.g., only the forward or rotational motion). The human movement model may be applied to transform the initial NDOF spatiotemporal representations into an updated NDOF spatiotemporal representations of the movement recordings. Additionally or alternatively, an optimal NDOF may be computed in the first place (skipping the initial NDOF) by applying the model to the measured (e.g., raw or partial NDOF) sensor data to maximize a joint probability matching the model and the measured sensor data.

In some embodiments, a reconstructed NDOF signal may be generated by maximizing a joint probability of the signal. $p_1(X)$ may represent the probability that an estimated motion signal X matches the signal recorded by the movement recorders. If the movement recorder directly records NDOF measurements, then $p_1(X)$ will be larger the more similar X is to the signal recorded, and lower the more different X is from the signal recorded. In some embodiments, $p_1(X)$ is a monotonic function of (e.g., inversely proportional to) the distance between X and the measured signal. If the movement recorder records data indirectly related to NDOF measurements, such as an IMU measuring rotation speeds, then $p_1(X)$ will be larger if the NDOF measurements associated with the estimated motion signal X is similar to the NDOF measurements extracted from the recorded data. In some embodiments, the IMU measurement of rotational speed is equivalent to a derivative of the angles of X (which yields the rotation speed induced by X). $p_2(X)$ may represent the probability that the estimated motion signal X is generated by a human motion model that represents a non-uniform likelihood of spatiotemporal representations of a plurality of movements corresponding to a non-uniform probability that the plurality of movements occur in a human body. $p_2(X)$ will be relatively larger when a motion has a relatively greater probability in the human motion model (e.g., typical motions such as standing still, walking), zero for impossible motions (e.g., rotating at speeds over 1000 degrees/second), and relatively lower for motions that are possible but less likely or uncommon. The reconstructed NDOF signal may be generated by maximizing the joint or dual probability $p_1(X)*p_2(X)$, to obtain the output signal with the highest joint probability according to both the measurements and the model. In some embodiments, only an approximate search for the X that maximizes $p_1(X)*p_2(X)$ is carried out instead of an exact search, in order to reduce run-time, computing resources or the like.

In some embodiments, a human motion model may be applied on the direct outputs of a motion recorder, and transform them into the same type of data but with improved quality, due to maximizing the joint probability of the recorded signal and the human motion model. In some embodiments, the recordings of an IMU are transformed using the human motion model into modified recordings that maximize the joint probability of the original IMU recordings and motion according to a human motion model. In other embodiments, motion recording that represent direct or indirect estimation of the NDOF are used to compute $p_1(X)$ (by computing the indirect measures for X and computing the similarity to the motion recordings) while the human motion model is used to compute $p_2(X)$, and by maximizing the joint probability $p_1(X)*p_2(X)$ an NDOF signal is generated from the inputs without requiring an initial step of computing NDOF movements that does not rely on the human motion model. In some other embodiments, the information from one or more sensor trackers may be combined or fused into an initial estimation of NDOF that does not rely on the human motion model. Then $p_1(X)$ is computed based on the similarity of X to the initial NDOF, while the human motion model is used to compute $p_2(X)$. A final NDOF signal may be generated by maximizing the joint probability $p_1(X)*p_2(X)$. While the symbol "*" generally refers to a scalar or vector product, any other operation may be used that composes the probabilities $p_1$ and $p_2$ (e.g., a weighted sum) and any other function of the probabilities may be used (e.g., powers of the probabilities, such as $p_1^2 \cdot p_2^2$).

In some embodiment, some or all of $p_1(X)$, $p_2(X)$ or $p_1(X)*p_2(X)$ may not be explicitly computed, only the X that at least approximately maximizes $p_1(X)*p_2(X)$ is computed.

A virtual, augmented or mixed reality image may be displayed, e.g., on a head-mounted display (HMD) or screen, based on the updated or optimized NDOF spatiotemporal representations of the movement recordings. The image may be rendered in real-time to represent a scene from the perspective of, or visualizing, the user based on its updated or optimized NDOF spatiotemporal representations.

Additionally or alternatively, the human movement model may be used to predict future motions as one or more most likely candidate motions to follow a current motion based on the model. Prior to receiving motion information at that future time, a VR, AR or MR device may render an image associated with the predicted future motion, which may be (or may not be) verified if the model is precisely correct, modified e.g. by time warping if the model is slightly incorrect, or discarded if the model is completely incorrect. By rendering an image for a future motion, based on the human motion model, before any information about movements at that time are recorded, the VR, AR or MR device may decrease motion-to-photon latency.

The human motion model may be discrete or continuous. A discrete model may sort a set of candidate movements into two or more distinct (e.g., complementary and/or non-overlapping) sets of permitted (e.g., having an above threshold probability, in a list of predefined allowed movements, or defined by a model simulation or function) or prohibited (e.g., having a below threshold probability, in a list of predefined non-permitted movements, or not defined by a model simulation or function), and/or one or more additional discrete ranges, levels or categories of motion likelihood between the prohibited and permitted categories. In one embodiment, a binary model may sort movements based on whether their probabilities are above or below a single threshold. A discrete model with three or more categories may use multiple thresholds to sort movements into a plurality of levels, e.g., from least to most likely. In some embodiments, the model may be continuous, e.g., defining one or more continuous probabilities or likelihoods of movements.

The human movement model may be temporally-dependent to model human motion or dynamics (e.g., trajectory, momentum, acceleration, etc.). Temporal-dependence may constrain the model to determine the output of the updated NDOF spatiotemporal representations in a current time or iteration based on the output from one or more previous iterations or times. In one example, if the change or derivative of forward motion from the previous to the current NDOF indicates a user is running at a high speed, the motion estimate in the next iteration will estimate an above threshold forward motion.

A human motion model may include, for example, polynomial models, avatar models, Hidden Markov models, Gaussian Mixture models, sparse dictionary models, movement language models, and/or any other model defining human motion. A polynomial model may model human motion or location by a nth-order (e.g., $5^{th}$ order) polynomial. An avatar model may define the geometry and constraints of a human (e.g., as a skeleton), which may be built using bones with fixed lengths, joints which have allowable and non-allowable trajectories or arcs, muscles which can provide certain accelerations, etc. A Hidden Markov model may define human motion as a set of "states", where there is probability of remaining in each state, or transitioning from one state to certain connected states (some state transitions associated with impossible motions are not allowable). A Gaussian Mixture model may define a set of human motions (e.g., position and angles over time) as a distribution of a weighted sum of a set of six-dimensional Gaussians for a 6DOF measurement, or any n-dimensional Gaussian for an NDOF measurement (or derivation thereof). A sparse dictionary model may include a dictionary of "atoms" or building blocks which define the basic set of components of motions. Each actual motion is represented as a combination of a number of these atoms. The atoms of the dictionary may be trained or pre-determined as a set of motion functions. A movement language model may define a set of basic motions (e.g., "stay", "move forward", "walk", "Jump", "look right", etc.) and then compose actual motions based on a combination of those basic motions as well as their parameters (e.g., look right 40 degrees, walk forward at 1 m/s, etc.).

The human motion model may be generated based on real observed and measured human motion (e.g., video recordings of humans moving), simulated (e.g., generated based on a computer model of a human), and/or trained based on a training dataset (e.g., of real or simulated human motion) using a neural network or other training method.

The model may be applied in various stages, for example, in pre-processing, during processing, or post-processing with respect to computing the motion signal. In a post-processing stage, the model may be applied to the output of a raw motion signal to calculate a 6DOF estimate in the first place or to an initial 6DOF calculation to improve or correct the estimation. During processing, the model may be added as a constraint or as a cost function for optimizing the motion estimation (e.g., by penalizing a cost, distance, or error of a motion signal from the model or penalizing a motion signal inversely proportionally to its likelihood according to the model). In a pre-processing stage, the model may be used to tune or set hardware or software parameters, e.g., to improve the quality of individual sensor's outputs, such as, IMU measurements or other raw sensor data used for computing the motion signal.

According to some embodiments of the invention, a device, system or method may train a human movement model representing one or more probabilitie(s), parameter(s), metric(s), and/or rule(s) of past, current or future movements. In one embodiment, the human motion model may be generated, e.g., in an offline phase, based on a training dataset of recordings of one or more human users moving. In one embodiment, the human motion model may re-train or increment each movement's probability each time the movement is recorded. Additionally or alternatively, the model may be simulated (e.g., as a skeletal or avatar model) or generated based on real observed and measured human motion (e.g., in a research setting).

The human motion model may be trained in various ways. Initially, a training dataset may be generated or obtained. The training dataset may include, e.g., thousands or millions of training signals. The training dataset may include one or a combination of noisy signals (e.g., having an above threshold noise level), slightly noisy signals (e.g., having a below threshold non-zero noise level), and/or noise-free signals (e.g., having a zero or near zero noise level). A noisy signal may use an (e.g., additional or integrated) learned transformation that maps a noisy signal to an improved signal. The training dataset is then used to train the model. The training process may vary depending on the model type. In one embodiment, a Gaussian Mixture model may fit parameters of the Gaussian (e.g., Gaussian numbers, means, covariances, weights, etc.) to the training dataset, outputting a Gaussian distribution that has a closest fit to the distribution of the input signals. In another embodiment, a sparse dictionary model (e.g., K-SVD) may include a set of atoms. An iterative process may initiate, starting with an initial dictionary, which may be a set of functions that best fit the signal (e.g., cos and sin in different frequencies). Then, the model may compute for each input signal its construction using the functions in the dictionary (e.g., while forcing the representation to be sparse, e.g., using only a small or minimal number of atoms). Then, each atom may be modified to best fit all the signals that use it. This process may be repeated (e.g., computing for each signal and updating the atoms) until the model converges or a certain number of iterations are performed.

The human movement model may be clustered into user-specific models, e.g., unique and different for each user, to learn the movements most likely to be performed by the specific user. A user-specific model may be trained by collecting the user's motion readings during runtime usage. The human movement model may be clustered into user-group or user-type specific models, e.g., unique and different for each user group or type, such as depending on age, height, weight, gender, etc., to learn the movements most likely to be performed by a user of a specific group or type. The human movement model may be clustered into task-specific models, e.g., unique and different for each task, game, interface, controller, or environment, to learn the movements most likely for a specific task (e.g., a user moves differently when playing a bowling game than a first-person shooter game). Models may be clustered explicitly or implicitly. In an explicitly clustered model, model data may be explicitly associated with and collected or sorted based on the associated cluster category (e.g., user, group, age, task, etc.). In an implicitly clustered model, model data may be clustered into groups of similar movements or behavior (though no similar categories are explicitly defined).

Once the model is generated, a motion estimator, e.g., operating in an online or runtime phase, may apply the human movement model to transform raw input NDOF spatiotemporal representations to updated NDOF spatiotemporal representations of the movement recordings to estimate current or predict future human motions in real-time. A virtual, augmented or mixed reality image may be displayed, e.g., on a head-mounted display (HMD) or screen, based on the updated NDOF spatiotemporal representations of the movement recordings. The image may be rendered in real-time to represent a scene from the perspective of, or visualizing, the user based on its updated NDOF spatiotemporal representations.

A motion estimation model improves the accuracy of the estimated motion by providing prior information as to how a signal can and can't be constructed. In humans, not all motions have the same probability of occurring. There are human movements that are impossible (e.g., extreme accelerations, or 360° rotations of joints), some that are very rare, and others that are very common (e.g., small angle head pivots). The non-constant distribution of the probabilities of various motions may be based on geometry (e.g., joints provide pivot points, bones moved as a rigid body, etc.) or coordination between different parts of the human body (e.g., when walking, the head is generally oriented along the trajectory of the walking path; when falling, the arms generally extend to support a shifted center of mass). In conventional models, impossible motions are predicted with the same probability as common motions leading to errors.

Because the human movement model has a non-uniform probability distribution for different movements, the model estimates common movements with greater probability than rare or impossible movements, thereby estimating motion with greater accuracy (e.g., as compared to a uniform or no movement model in which all movements have equal probability of occurring). Further, because the model is generated based on human movements, the motion estimator reflects human-specific motion restrictions and preferences and will thus more accurately predict motion patterns specific to humans. In particular, when the model is user-specific, group-specific, or task-specific, the motion estimator will more accurately reflect the real motion patterns of that individual user, group or task. Implementing this human model as a software boost to accuracy may allow relatively low-precision hardware sensors (with relatively limited accuracy) to perform with comparable precision to relatively high-precision sensors. This may obviate the need for more sensors, higher-precision sensors, or more power typically used to boost accuracy. Thus, implementing the human motion model according to embodiments of the invention may reduce the cost, size, power, number of components, and complexity of the system.

Further, the human movement model may improve efficiency by eliminating impossible motion candidates, scaling down the number of candidates and computations for analysis. The human movement model may have a zero (or approximately zero) probability or non-permitted movements corresponding to movements that are impossible, improbable, or never/rarely recorded for a user. Motion estimator may eliminate (or simplify by setting to zero) computations for these zero or below threshold probability or non-permitted movements, thereby significantly reducing the number, complexity, power consumption and time for calculating motion estimation computations (e.g., as compared to an untrained motion estimator that must evaluate all motions). Such a reduction in computations may increase motion estimation speed and decrease motion-to-photon latency and delay, e.g., rendering a faster and more responsive VR, AR, and/or MR system. A reduction in latency may further correspond to a decrease in the timescale of future motion prediction, which exponentially improves motion prediction accuracy.

"Movement," "motion" or "mobility" may refer to any of position, orientation, location, timing, speed, velocity, acceleration, trajectory, momentum, or rotational components thereof, or any other spatiotemporal states or dynamics, or combinations or derivations thereof. Movements may be recorded for any body part of a user, for example, including but not limited to head, eyes (line of sight), torso, arms, legs, hands, entire body, and/or any combination thereof.

"Degrees of freedom" or "DOF" may refer to the number of independent axes along which movement of a rigid body is recorded in three-dimensional space. DOF measurements may be taken from a single motion recording at a single time (for static movement) or a function of multiple motion recordings at multiple times (for dynamic movement). For example, NDOF may measure position, orientation, location, speed, velocity, acceleration, trajectory, momentum, rotational components thereof, or any derivation (e.g., any order derivatives or integrals) thereof, along any N axes or dimensions. In some embodiments, movement is recorded in an integer number (N) DOF (NDOF). In one example, movement is recorded in NDOF, e.g., six DOF (6DOF) estimating forward/backward (surge), up/down (heave), left/right (sway) translations, in three perpendicular axes, combined with changes in orientation through rotation about three perpendicular axes, often termed pitch, yaw, and roll. Additional or different axes may be used to record NDOF. NDOF measurements may represent all or a partial subset of the N dimensions (e.g., only motion along one or more of the N dimensions).

"Virtual Reality" or "VR" may refer to a virtual scene, in which the point of view (POV) of the scene is determined based on a user's measured movements (e.g., a user rotating their head to the left causes the VR scene to shift to the left). In some embodiments, VR scenes may be entirely virtual, e.g., composed exclusively of simulated graphics (and no real-world graphics or image representations).

"Mixed Reality" or "MR" may refer to a combination virtual and real-world scene, in which the virtual scene is overlaid on a rendered video stream of the real-world scene. The real-world scene may directly follow the user's movements (e.g., the real-world scene being recorded by camera(s) mounted to the user's headset or body) and the virtual scene may be simulated to have a POV calculated based on the user's movements.

"Augmented Reality" or "AR" may refer to a combination virtual and real-world scene, in which the virtual scene is overlaid on an actual (e.g., non-rendered) real world scene (e.g. viewed via a "see-through" display, such as optical lenses or without any mediating device between the user's eye and the real-world objects). Both virtual and real-world scenes react to user movements—the real world POV changes naturally according to eye optics, and the virtual POV changes by updating the reference frame corresponding to changing calculations of user or head movements.

"Head-mounted display" or "HMD" may refer to a display device mounted to a user's head, for example, via a mounting device such as a harness, a helmet, a rig, or a visor. In mixed and augmented reality (AR) platforms, HMDs place images of virtual objects over images (or see-through optics of) real world objects in the user's field of view. In virtual reality (VR) platforms, HMDs display a completely computer-generated image in the user's field of view. The imaged scene is rendered from a viewpoint corresponding to the NDOF of the user's head as determined by motion trackers. Modern HMDs often employ sensors for six degrees of freedom (6DOF) (although any NDOF may be used) monitoring that allow the system to align virtual information to the physical world and adjust the POV according to the user's head movements.

Figure 1B:
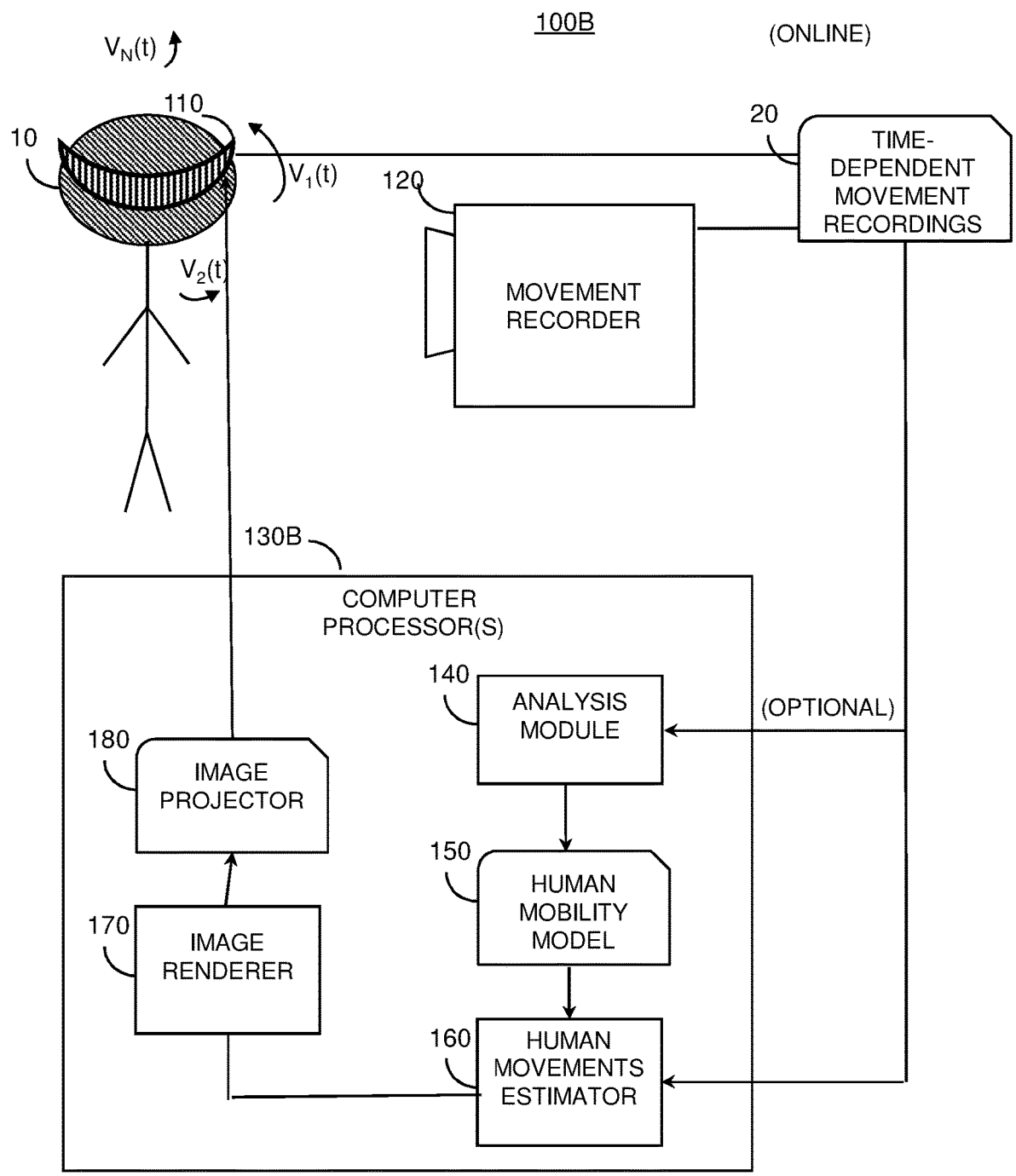
FIG. 1B is a schematic illustration of an example system for estimating motion using a trained human motion model in an online phase, in accordance with some embodiments of the invention.

An "offline" phase may refer to a period of time during which human movements are recorded for training or generating a human movement model (e.g., 150 of FIGS. 1A and 1B). In some embodiments, for example in a VR, MR or AR system, those human movements are not used for rendering images in a reference frame corresponding to those movements. In other embodiments, human movements in a training dataset may also be used for rendering images in addition to training the model. In embodiments where training is used for runtime rendering, or runtime data is used for training, the training (offline) phase and the runtime (online) phase may execute simultaneously or during overlapping times.

An "online" or "runtime" phase may refer to a period of time during which human movements are recorded for rendering and displaying to a user images in a reference frame corresponding to those movements, for example, determined based on the human movement model generated in the offline phase. The online phase may follow completion of the offline phase or may run in parallel thereto.

Rendering an image based on motion (e.g., NDOF) measurements may refer to either directly transforming the motion measurements to image data for rendering an image (e.g., a reference frame or coordinates of the image, field of view of the image, or object motion in the image), or indirectly transforming the motion measurements to image data (e.g., transforming the motion measurements to intermediate motion or parameter data, such as coordinates of a landmark or a 3D environment, and then using that landmark or 3D environment, in turn, to compute the image data). An image may refer to a frame on a display or a hologram.

Some embodiments of the invention may provide a device, system or method that improves a real-time estimation of the position and orientation (P&O) of a head or other body part of a human user by using real-world data recording the motion of one or more human(s). Improving the estimation of the P&O of the head may also assist with estimating the line of sight determined by the direction of the pupils of the eyes.

In tailoring movement estimators to the movements of human beings, some embodiments of the present invention take advantage of the fact that, due to anatomical and physiological constraints, human movements are limited to only a small subset of all possible (e.g., N=6) DOF movements. In addition, human movements may present a time dependent statistical relationship between specified movements.

In order to achieve this end, data indicative of human movement patterns may be used according to some embodiments of the invention in order to improve the estimation of current or future movements of the user.

Due to anatomical and physiological reasons, human movement patterns are very much restricted compared to, for example, a non-restricted set of three gimbals, one mounted on the other with orthogonal pivot axes, defining all 6DOF motions. Additionally, as the human body is not rigid, multiple body parts (e.g., head, eyes, arms, etc.) move independently, and the body may not be represented by a single set of N DOF. Therefore, some embodiment may include a plurality of models for estimating the movement of a plurality of respective body parts (e.g., head motion model, eye motion model, body motion model, etc.). Multiple body-part models may be interrelated, for example, to predict additional joint probabilities for combinations of movements of the multiple body-parts (e.g., defining a higher joint probability of a user moving a hand along the trajectory of the eye's line of sight than in another direction).

While a single set of N DOF has, from a probabilistic point of view, a uniform probability distribution function (PDF) as to the position and orientation, the human body is much more restricted, and a PDF describing human movements is generally non-uniform in nature. The human movement model, trained by recording movements of the human body, may thus represent non-uniform probabilities of a human performing a plurality of movements.

Reference is made to FIGS. 1A and 1B, which are schematic illustrations of example systems 100A and 100B in an offline phase and an online phase, respectively, in accordance with some embodiments of the invention. In some embodiments, systems 100A of FIG. 1A may operate in an offline or training phase and system 100B of FIG. 1B may operate in an online or image rendering phase, although in other embodiments components from either system 100A or 100B may operate in either online or offline phase. Systems 100A and 100B may be the same or different systems.

Systems 100A and/or 100B may include a virtual reality (VR), augmented reality (AR) and/or mixed reality (MR) device 110 worn, attached or mounted to a user 10. User device 110 may be, for example, VR, AR, or MR headset or glasses displaying simulated graphics in the field of view of the user that are fully virtual (VR) or partially virtual (AR/MR). User device 110 may include one or more sensor(s) to measure the motion of a user 10, such as head or hand-mounted cameras, gyroscopes and/or accelerometers.

Systems 100A and/or 100B may include a movement recorder 120 comprising one or more sensor(s) to measure the motion of a user 10 head, hand, line-of-vision, body, body part, and/or user device 110, such as a headset, glasses, glove, etc. Movement recorder 120 may include sensor(s) that are separate or external from user device 110, for example, one or more cameras imaging the user. Additionally or alternatively, movement recorder 120 may be operatively coupled to user device 110 sensor(s). Movement recorder 120 may include sensor(s) and component(s) that are integral/internal, separate/external, or a combination of integral/internal to and separate/external from, user device 110. In some embodiments, a movement recorder 120 (e.g., camera) separate from user device 110 may only be used in the offline training system of FIG. 1A and not the online image rendering system of FIG. 1B. Alternatively, external movement recorder 120 may be used in the online image rendering system of FIG. 1B instead of or to supplement motion measurements from user device 110.

In reference to FIG. 1A, e.g., in an offline or training phase, movement recorder 120 is configured to measure a plurality of human movement recordings 22, e.g., $V_1(t) \ldots V_N(t)$, defining any of position, timing, speed, velocity, acceleration, orientation, or any combination thereof, of at least one human user 10 or a body part or an object such as user device 110 attached to or held by human user 10. Movement recordings 22 may define NDOF spatiotemporal representations of the movements. Movement recordings 22 in the offline phase may be recorded continuously and need not (but may) be associated with a recording time. Movement recordings 22 may be calibrated, segmented, clustered, normalized or otherwise processed and stored, for example, in a database repository or storage unit 24. Movement recordings 22 may be sampled or retrieved from repository 24 and analyzed by an analysis module 140 executed by a computer processor 130A. Storage and retrieval may be performed on individual recordings, one-by-one, for a sequence of the recordings.

Analysis module 140 may analyze movement recordings 22 to generate, e.g., in an offline or training phase, a human movement model 150 defining rules, parameters and/or constraints as to how an individual human, or alternatively a representative group of humans, are permitted (and/or not permitted) to move. According to some embodiments of the present invention, human movement model 150 may include spatiotemporal representations of movements of the at least one human user 10 generated based on movement recordings 22 of user 10 and/or user device 110 recorded by movement recorder 120. Human movement model 150 may define a non-uniform probability of various NDOF spatiotemporal representations of movements corresponding to a non-uniform probability that the movements occur in a human body.

Human movement model 150 of the spatiotemporal representations of movements may be modeled according to several embodiments including, for example, polynomial models, avatar models, Hidden Markov models, Gaussian Mixture models, sparse dictionary models, movement language models, and/or any other model defining human motion. In one embodiment, human movement model 150 may define a sole or joint probability distribution function (PDF) of movements (e.g., acceleration, velocity and/or position) and/or of different body parts (e.g., head, hands, eyes, etc.) such as but not limited to a Hidden Markov model (HMM). In some embodiments, human movement model 150 may define limitations (e.g., exclusion of motions) or sparsity (e.g., inclusion of motions) of possible joint values of movements (e.g., acceleration, velocity and/or position). In some embodiments, human movement model 150 may define sparse representation by dictionaries, in which movements recorded during runtime are represented as a combination of a small number of basic movements ("atoms") in the dictionary. The "atoms" are generated during the training stage to be the "words" in the sparse dictionary. In some embodiments, human movement model 150 may be trained using one or more neural networks (NN), wherein the NN is learned from a training dataset comprising "true" or relatively better signals. In one embodiment, when a movement is input into the NN, the NN outputs a classification of the movement as possible or impossible (binary model). In another embodiment, when a movement is input into the NN, the NN outputs a classification of the movement as one of N levels of probability (e.g., impossible, low, medium, high or any other categorization) (discrete model). In another embodiment, when a movement is input into the NN, the NN outputs an absolute or relative probability of the movement (continuous model). In another embodiment, when a movement is input into the NN, the NN outputs a movement with a highest probability according to both the model and the input (e.g., a joint probability taking into account both the input data and the model).

In some embodiments, human movement model 150 may include a probability distribution function (PDF) defining the probability of movements in each of (N) DOF. The probability distribution function (PDF) may be populated by movement recordings 22, for example, incrementing the probability of each movement each time that movement is depicted in movement recordings 22. The probability distribution function (PDF) may be equated with the raw populated distribution of movement recordings 22, or may be a best fit approximation thereof. In some embodiments, each monitored body part (e.g., head, eye(s), etc.) may have an independent or interrelated probability distribution function (PDF). The probability distribution function (PDF) may be non-uniform to represent the non-uniform nature of human motion, which has both preferred and prohibited movements. For example, the probability distribution function (PDF) of a user's head rotating about a vertical axis (e.g., centered along the length of the neck) may have a maximal probability at zero degrees rotation (e.g., centered facing forward at rest) and may decrease asymptotically (e.g., approximately parabolically, logarithmically or exponentially) to a minimal (e.g. zero) probability at +/−180° rotation (e.g., a prohibited or impossible position of a head rotating fully behind user). Because each user has different movement patterns and preferred positions, the probability distribution function (PDF) generated based on movement recordings 22 may differ for each user. In some embodiments, human movement model 150 may be non-time-dependent, such that, movement recordings 22 are not associated with the time when that movement was recorded (e.g., not time-stamped). In some embodiments, human movement model 150 may be an N DOF model (e.g., N=6) representing motion along any integer number of N independent axes.

In some embodiments, human movement model 150 may be user-specific, for example, defining movement(s) specific to each individual user so that each of a plurality of users have a unique respective one of a plurality of different models. Such a human movement model 150 may be trained by each individual user forming a user-specific "movement signature" unique to that user. In some embodiments, human movement model 150 may be specific to a group or type of users, for example, associated with a particular movement style, a specific character, a specific activity, a specific physical type such as a height, age and/or weight range, a specific gender, etc. Such a human movement model 150 may be trained by one or more human representatives of that type or group of users. In some embodiments, a universal human movement model 150 used for all users may be trained by one or more representative users. In some embodiments, human movement model 150 may be specific to a certain interface, task or game (e.g., users tend to move differently when performing different tasks, such as, simulated bowling vs. simulated shooter games). The training user 10 may be a real human moving in the real world, a video of a human, or a virtual avatar modeled to move like a human.

In reference to FIG. 1B, e.g., in an online or runtime phase, user device 110 and/or external movement recorder 120 may record a user's movements in real-time. Movement recordings 20 in an online phase may be recorded periodically (e.g., not continuously) and may be time-dependent, such that, each recording is associated with a recording time when that movement was recorded (e.g., time-stamped). In some embodiments, both user device 110 (e.g., a VR, MR, or AR headset) and movement recorder 120 (e.g., a camera imaging the user) may record movement recordings 20 in an online phase, while in other embodiments, only user device 110, or only movement recorder 120, may be used in the online phase.

In some embodiments, movements recordings 20 may be sent directly to a human movement estimator 160, e.g., a Kalman estimator, along with metrics from human movement model 150, to perform motion estimation.

Additionally or alternatively, movement recordings 20 may be sent to analysis module 140 to update and train human movement model 150 in the online phase. In such embodiments, movement recordings 20 may be sent to both analysis module 140 and human movement estimator 160, for example, in parallel (e.g., simultaneously) or in sequence (e.g., non-simultaneously). In some sequential embodiments, a current iteration's movement recording 22 may be used to alter the human movement model 150 and estimate motion in the current iteration, whereas in some parallel embodiments, a current iteration's movement recording 22 may alter the human movement model 150 in the current iteration but only be used to estimate motion in the next iteration.

Human movement estimator 160, executed by computer processor 130B, may apply the human mobility model 150 to the received real-time user movement recordings 20, which estimate all movements with equal probability (e.g., equal probability in all N dimensions of NDOF), to generate updated motion estimates based on a non-uniform probability of movements in model 150, e.g., tailored per human-specific movement patterns. The motion estimate may be one or more movements that maximize a joint probability (e.g., $p_1 * p_2$) of the probability (e.g., $p_1$) of matching the measured input movement recordings 20 and the probability (e.g., $p_2$) of matching the human movement model 150. The motion estimate may input movement recordings 20 recorded at a past or current recording time $t_0$ to estimate movements at the current recording time $t_0$ or to predict possible human motion at a present or future time $t_N$. For motion prediction, human movement estimator 160 may compare the user's real-time movements at current time to with human movement model 150 to estimate one or more most likely future candidate movement(s) at future time $t_N$ (e.g., future possible position(s), timing(s), speed(s), velocitie(s), acceleration(s) and/or orientation(s)). A plurality of most likely current or future candidate movements may be ordered based on their likelihoods and/or may be associated with confidence values. Alternatively, a single most likely or above threshold likelihood movement may be selected.

According to some embodiments of the present invention, each of a plurality of human movement models 150, based on various motion parameters, body parts, modelling types, etc. may be used, alone or in conjunction, to improve motion estimator 160. In some embodiments, a PDF model 150 may be used to enhance motion estimators, such as, a Kalman estimator, by integrating the model 150, a noise model, and the motion measurements. In some embodiments, a NN model 150 may be used to enhance motion estimators by the NN transforming a section of movement recordings or N DOF. The motion estimator 160 may use the transformed results instead of, or in conjunction with, real movement recordings of the N DOF.

Human movement estimator 160 may estimate motion in all N DOF of the model 150. In some embodiments, human movement estimator 160 may optimize performance by dynamically adjusting the frequency of motion estimation, the number or types of models 150 applied, or other parameters, used to estimate motion in real-time, for example, to balance system speed and accuracy. For example, in cases where image rendering speed is below a threshold, human movement estimator 160 may decrease the frequency of motion estimation to reduce computations and increase image rendering speed, whereas human movement estimator 160 may increase the frequency of motion estimation when image rendering speed is above a threshold.

Human movement estimator 160 may send, in the online phase, the motion estimation information to an image renderer 170 (e.g., in user device 110 or another device such as processor(s) 130B). Image renderer 170 may render one or more (M) (e.g., VR, AR, or MR) image(s) corresponding to the one or more movement(s) estimated or predicted to occur at a current to or future time $t_N$. In embodiments in which human movement estimator 160 outputs multiple (M) candidate movements, image renderer 170 may render all or only a subset of (M) images corresponding thereto. In one embodiment, image renderer 170 may render images in sequential order of decreasing likelihood and/or confidence values associated with the future candidate movement(s). In other embodiments, image renderer 170 may render multiple images for multiple (e.g., all or a subset of) movements in parallel. In some embodiments, image renderer 170 may render images corresponding to a fixed number of future candidate movement(s) (e.g., the top integer number M of most likely images). In some embodiment, image renderer 170 may render a variable number M of images corresponding to a variable number of future candidate movement(s), for example, based on an amount of dynamically allocated computational resources. For example, when relatively small computational resources are available, image renderer 170 may render a single or relatively few images corresponding to a single or relatively few future candidate movement(s), whereas when relatively large computational resources are available, image renderer 170 may render all M or a relatively greater number of images corresponding to all or a relatively greater number of candidate movement(s).

Image renderer 170 may send an image projector 180 (e.g., in user device 110 or another device) an image to be displayed at each time $t_N$, e.g., based on the movement recorded at a time just prior to display $t_{N-\varepsilon}$ (e.g., where $\varepsilon$ is a minimal motion-to-photon latency for computing the user's movements, such as, 1-2 ms) Image renderer 170 may send image projector 180 the rendered image corresponding to a candidate movement that matches (or most closely matches) or is extrapolated from the recorded movement or rendered image. Image display 180 may display the rendered image at each time $t_N$. If a candidate movement matches (or is within a threshold difference of) the actual detected movement, image projector 180 will display the predicted images or the closest image may be adapted (e.g., time shifted) to better approximate the user's real motion. If no candidate movement matches (or is greater than a threshold difference of) the actual detected movement, no motion estimation may be used and image projector 180 may project holograms that appear out of place (e.g., mm and cm from the optimal position in the image), have reduced stability (e.g., resulting in a shaky image), or have otherwise degraded accuracy.

Because image renderer 170 begins rendering images based on estimated motion at an initial time $t_0$ before the corresponding movement is detected by user device 110 at future time $t_{N-\varepsilon}$ (e.g., just prior to displaying the images at time $t_N$), the images have less motion-to-photon latency compared to images rendered without motion estimation. For example, motion estimation reduced latency by the image rendering time, such as, 16 ms, only experiencing motion detection latency, such as, head tracking time of 1 ms. This reduction in motion-to-photon latency may produce images based on more recent movements (e.g., within $\varepsilon$ e.g. 1 ms of display), for example, yielding a more responsive VR, AR, and/or MR environment. Additionally or alternatively, generating estimated movements based on human model 150 may generate more accurate images than if no model were used because human model 150 predicts movement based on a subset of, or a non-uniform probability of, human motion, e.g., prioritizing possible or real-world verified human motions and deprioritizing relatively less likely motions and/or eliminating impossible motions (e.g., a user's head rotating 360°). Additionally or alternatively, by increasing accuracy, human motion model 150 may be used with relatively simple or low-precision sensors and algorithms to achieve the same or comparable performance as relatively complex or high-precision sensors and algorithms. Because relatively low-precision sensors and algorithms typically use fewer computations and estimate motion with increased speed, human motion model 150 may increase the speed and efficiency of motion estimation. Additionally or alternatively, generating estimated movements based on human model 150 may significantly increase the speed of motion estimation because motions are considered in order of their likelihood and/or only a subset of above-threshold likelihood or possible motions are analyzed (e.g., a subset of all N DOF movements) and/or below-threshold likelihood or impossible motions are not analyzed, thereby saving associated computational effort, resources and time. Embodiments using the individual-user or user-group model further increase accuracy and rendering speeds because the model is trained to analyze a subset of movements verified for that specific user or user-group.

User device 110, movement recorder 120, analysis module 140, human movement estimator 160, image renderer 170, and/or image projector 180, may each include or be implemented by one or more controller(s) or processor(s), e.g., processor(s) 130A or 130B of FIGS. 1A and 1B, for executing operations and one or more memory unit(s), e.g., repository 24 of FIGS. 1A and 1B, for storing data and/or instructions (e.g., software) executable by a processor. Processor(s) may include, for example, a central processing unit (CPU), a digital signal processor (DSP), a microprocessor, a controller, a chip, a microchip, an integrated circuit (IC), or any other suitable multi-purpose or specific processor or controller. User device 110, movement recorder 120, analysis module 140, human movement estimator 160, image renderer 170, and/or image projector 180, may retrieve and/or store data and/or execute software according to computer code stored in one or more memory unit(s), such as, repository 24. Memory unit(s) may include, for example, a random-access memory (RAM), a dynamic RAM (DRAM), a flash memory, a volatile memory, a non-volatile memory, a cache memory, a buffer, a short-term memory unit, a long-term memory unit, or other suitable memory units or storage units.

The systems of FIGS. 1A-1B may include additional components (not shown), shown components may be omitted, and the arrangement of components may be altered. Devices or components shown as separate may be combined into a single integral device and components shown as integrated in a single device may be separated into multiple different devices.

Human movement model 150 may take many forms. Due to anatomical and physiological reasons, human movement patterns may be significantly restricted as compared to, for example, a non-restricted set of three gimbals, one mounted on the other with mutually orthogonal pivot axes. While the latter has, from a probabilistic point of view, a uniform probability distribution function (PDF) as to the position and orientation, movement of the human body is restricted and a PDF describing such movements may thereby be non-uniform.

In some embodiments, a PDF that may define the likelihood of movements of a human being may be hysteretic in the sense that a likelihood of a certain movement occurring from one point to another may dependent upon previous movements.

In some embodiments, human movement model 150 may include a co-dependence between human movements and other activities carried out concurrently by the human. For example, an individual may have more restricted head movements when running than when sitting. A probabilistic relationship between two or more movements (e.g., running and head rotation) may be monitored, analyzed, and a joint probabilistic model or PDF may be generated accordingly.

The offline profiling process in accordance with some embodiments of the present invention yielding human movement model 150 may be in the form of a joint probability PDF associating at least one of: position, orientation, speed, rotation speed, and acceleration and acceleration speed in a future time, based on at least one of: position, orientation, speed, and acceleration in a present time.

According to some embodiments of the present invention, human movement model 150 may be analyzed to derive human movement metrics, for example, by distinguishing between valid (permitted) movements (e.g., having non-zero PDF values) and non-valid (restricted) movements (e.g., having zero or approximately zero PDF values).

According to some embodiments of the present invention, the human movement model 150 may be calculated separately for each of a plurality of groups of movements.

According to some embodiments of the present invention, the groups of movements may be created by unsupervised learning of clusters of sections of movements, wherein said clusters may include groups of movements that have a similar model. In one embodiment, clustering may be performed explicitly by "labeling" each record with one or more clustering parameters (e.g., user-type, age, height, etc.). Alternatively, clustering may be performed implicitly (no explicit categories or parameters are associated with each record) by automatically generating clusters of records into distinct groups that share similar behavior with other records in the same group and have different behavior from other records in the different groups. A model may be trained based on each of these clusters or groups. During run-time, a processor (e.g., 130B of FIG. 1B) may detect which one or more of a plurality of groups is most similar to the recorded signal, and may use the model(s) trained for the specific group(s) to estimate the motion of the recorded signal.

According to some embodiments of the present invention, the groups of movements may be created by supervised learning of a movement language.

According to some embodiments of the present invention, the groups of movements may be associated with one or more of: gender, age, weight, height, flexibility, movement style, activity, and a character.

According to some embodiments of the present invention, human movement model 150 may be analyzed to derive human movement metrics, for example, by applying a de-noising function to a combined input indicative of a spatiotemporal representation of movements carried out by at least one human user.

According to some embodiments of the present invention, movement recordings 20 and/or 22 may be a received from a combination of an image capturing device (e.g., movement recorder 120) and a positioning device (e.g., user device 110, such as, a VR, MR or AR headset or glasses), or only one of the image capturing and positioning device.

According to some embodiments of the present invention, human movement model 150 may be generated by monitoring a plurality of movements applied by the at least one human user and analyzing the movements based on a predefined spatiotemporal frame of reference.

According to some embodiments of the present invention, the one or more human users 10 may include a plurality of human users and wherein the method further comprising generating a database of a plurality of human movement models for the plurality of respective human users. In some embodiments, the human movement metrics may be used to enhance an estimator of human movements, e.g., based on a generalized model of human movement aggregating all or a subset of (e.g., relevant to the user's group, type, or task) the plurality of human movement models.

According to some embodiments of the present invention, the computer processor may be further configured to cluster the database based on different types of activities carried out by the plurality of users, and aggregate or use one or more model clusters corresponding to a plurality of users that conduct similar movements.

According to some embodiments of the present invention, the activities comprise at least one of: lying, sitting, standing, walking, and running.

According to some embodiments of the present invention, human movement model 150 may be generated by monitoring a plurality of movements in a plurality of postures of the at least one human user, to yield a user-specific movement profile, wherein the human movement metrics are used to enhance an estimator of human movements based on a user-specific model of human mobility.

According to some embodiments of the present invention, the postures may include at least one of: lying, sitting, standing, walking, and running.

According to some embodiments of the present invention, the computer processor may be further configured to apply the enhanced estimator to real-time movement recordings 20 of at least some metrics comprising movements of a human user.

According to some embodiments of the present invention, movement recordings 20 and/or 22 may be recorded using at least one of: an inertial measurement unit (IMU); a gaze detector; a head-mounted tracking system, and an external tracking system.

Figure 2:
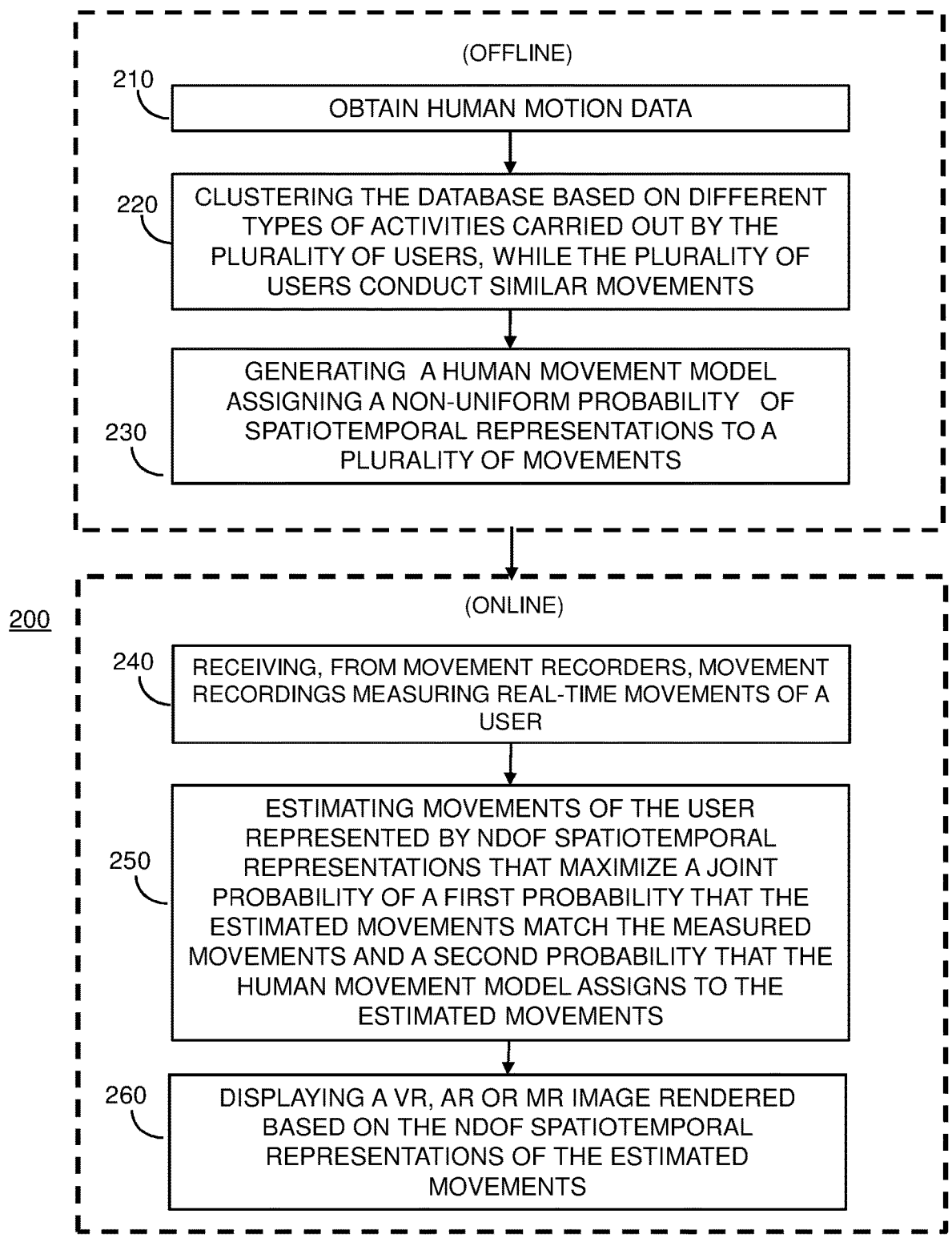
FIG. 2 is a flowchart of an example method for estimating movement based on a human movement model in a virtual, augmented or mixed reality environment, in accordance with some embodiments of the invention.

Reference is made to FIG. 2, which is a flowchart of an example method 200 for estimating movement based on a human movement model in a virtual, augmented or mixed reality environment, in accordance with some embodiments of the invention. Method 200 may be executed by one or more processor(s) in a virtual, augmented or mixed reality device. For example, operations 210-230 may be performed in an offline phase by processor 130A of FIG. 1A and operations 240-260 may be performed in an online phase by processor 130B of FIG. and 1B, although other processors or system components may also be used.

In some embodiments, operations 210-230 may be executed in an offline phase as follows:

In operation 210, one or more processor(s) may obtain human motion data (e.g., recordings 22 of FIG. 1A) of one or more human user(s) (e.g., 10 of FIGS. 1A and/or 1B). Human motion data may be obtained from movement recorder (e.g., 120 of FIG. 1A) or one or more memories (e.g., repository 24 of FIG. 1A). Human motion data may include recordings of real human motion of one or more human users recorded by one or more sensors. Additionally or alternatively, human motion data may include a simulated computer model of human motion.

In operation 220, one or more processor(s) may cluster the human motion data, for example, explicitly based on clustering parameters such as different types of activities carried out by a plurality of users, or implicitly based on similar movements. Clustering may group data common to one or more parameters selected from the group consisting of: user identity, age, gender, height, weight, flexibility, movement style, activity, and character.

In operation 230, one or more processor(s) may generate one or more human movement model(s) (e.g., 150 of FIGS. 1A and/or 1B) of the human user(s). The human movement model may assign a non-uniform probability of spatiotemporal representations that a plurality of movements corresponding to a non-uniform probability that the plurality of movements occur in a human body of the one or more human user(s). Multiple models may be generated for the multiple respective clusters. The one or more human movement model(s) may be stored in one or more memories.

In some embodiments, the human movement model(s) may be generated by machine learning. In a model training phase, the one or more processor(s) may receive a training dataset of movement recordings of one or more users, and train the human movement model to define the non-uniform probability of spatiotemporal representations of a plurality of movements based on a non-uniform distribution or frequency of instances of the plurality of movements detected in the training dataset.

Human movement model(s) may take many forms. In some embodiments, the human movement model(s) may distinguish user movements between one or more discrete sets of permitted, prohibited, or other categories of spatiotemporal representations of movements. In some embodiments, the human movement model defines one or more continuous probabilities of spatiotemporal representations of movements. In some embodiments, the human movement model has a temporal dependence that determines the NDOF spatiotemporal representations at a current time or iteration based at least partially on the NDOF spatiotemporal representations from one or more previous times or iterations. In some embodiments, the human movement model is a neural network that is trained based on a training dataset of real and/or simulated human movements. In some embodiments, the human movement model may be represented by one or more nth-order polynomials. In some embodiments, the human movement model may be one or more human avatars. In some embodiments, the human movement model may be a Hidden Markov model that defines human motions as states with a probability of remaining in each state or transitioning to connected states. In some embodiments, the human movement model may be a Gaussian Mixture model that defines human motions as a distribution of a weighted sum of a set of N-dimensional Gaussians representing NDOF spatiotemporal representations. In some embodiments, the human movement model may be a sparse dictionary model comprising a dictionary of building blocks of component motions. In some embodiments, the human movement model may be a movement language model that defines basic human motions that are composed into more complex human motions.

In some embodiments, operations 240-260 may be executed in an online or real-time phase as follows:

In operation 240, one or more processor(s) may receive, from one or more movement recorders, movement recordings measuring movements of a user. Movement recorders in operation 210 and/or 240 may include one or more of: an inertial measurement unit (IMU), a gaze detector, a head-mounted tracking system, a hand-mounted tracking system, an external tracking system, and an image capturing device.

In operation 250, one or more processor(s) may estimate one or more movements of the user represented by spatiotemporal representations of a plurality of (N) degrees of freedom (DOF). The estimated movements may be determined that at least approximately maximize a joint probability p1*p2 comprising a first probability p1 that the measured movements match the estimated movements and a second probability p2 that the human movement model assigns to the spatiotemporal representations of the estimated movements (e.g., the likelihood that a human produces the measured movements according to the model). In some embodiments, the joint probability may include additional probabilities p3, p4, . . . , pN. In one embodiment, the additional probabilities may be specific to each of multiple body-part specific sub-models that are interrelated to predict the joint probability based on additional probabilities defining the combinations of movements of the multiple body-parts. In one embodiment, the additional probabilities may represent at least one of: position, orientation, speed, and acceleration or rotational components thereof in a present or future time, based on at least one of: position, orientation, speed, and acceleration or rotational components thereof in a past or present time.

In some embodiments, the one or more processor(s) may receive an initial spatiotemporal representation of a plurality of (N) degrees of freedom (DOF) of the estimated movement and apply the human movement model to transform the initial NDOF spatiotemporal representations to an updated NDOF spatiotemporal representations of the estimated movement. In other embodiments, the human movement model may be applied to raw motion data to generate NDOF spatiotemporal representations of the estimated movement in the first place.

The estimated movements may represent current motion or may be predictive to estimate future motion. For example, the human movement model may be applied to the user movements to predict, based on a movement recorded at a current time, a movement estimated to occur at a future time. Additionally or alternatively, the human movement model may be applied to correct the user movements in the past, e.g., to improve 3D landmarks or model.

In embodiments, when a combination of multiple different types of recorders are used in operation 240, the NDOF spatiotemporal representations may be a fusion of data recorded from the multiple different types of movement recorders.

In operation 260, one or more processor(s) may display a virtual, augmented or mixed reality image rendered, directly or indirectly, based on the NDOF spatiotemporal representations of the estimated movements. For indirect rendering, the NDOF measurement may be further processed by additional motion estimators (e.g., a Kalman filter) or to generate motion data for additional objects (e.g., landmarks or environments) that are then used to render a virtual image.

Other operations may be used, additional operations may be added (e.g., the NDOF estimation in operation 250 is additionally processed by intermediate motion estimators to indirectly result in image rendering in operation 260), operations may be omitted (e.g., clustering operation 220), and the order of operations may be rearranged in the method 200 of FIG. 2.

A method and a system is provided for improving an estimation of human movements using a movement model. The method may include: obtaining, in an offline phase, a human movement recordings of at least one human user, wherein the human movement recordings are indicative of spatiotemporal representation of movements carried out by the at least one human user; analyzing the movement recordings, to derive a human movement model; and using metrics derived from the human movement model to enhance an estimator of human movements, wherein the estimator is configured to estimate a future human movement carried out by the at least one human user in a future time, based on a momentary human movement recording in an online phase.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for estimating movement based on a human movement model in a virtual, augmented or mixed reality environment, the method comprising:
   in a virtual, augmented or mixed reality device:
      storing the human movement model assigning a non-uniform probability of spatiotemporal representations of a plurality of movements corresponding to a non-uniform probability that the plurality of movements occur in a human body;
      receiving, from one or more movement recorders, movement recordings measuring movements of a user;
      estimating one or more movements of the user represented by spatiotemporal representations of a plurality of (N) degrees of freedom (DOF) that maximize a joint probability comprising a first probability that the measured movements match the estimated movements and a second probability that the human movement model assigns to the spatiotemporal representations of the estimated movements; and
      displaying a virtual, augmented or mixed reality image rendered based on the NDOF spatiotemporal representations of the estimated movements.

2. The method of claim 1 comprising:
   receiving an initial spatiotemporal representation of a plurality of (N) degrees of freedom (DOF) of the estimated movement; and
   applying the human movement model to transform the initial NDOF spatiotemporal representations to an updated NDOF spatiotemporal representations of the estimated movement.

3. The method of claim 1 comprising, in a model training phase:
   receiving a training dataset of movement recordings of one or more users; and
   training the human movement model to define the non-uniform probability of spatiotemporal representations of the plurality of movements based on a non-uniform distribution of instances of the plurality of movements detected in the training dataset.

4. The method of claim 1 comprising applying the human movement model to predict, based on a movement recorded at a current time, a movement estimated to occur at a future time.

5. The method of claim 1, wherein the human movement model distinguishes user movements between one or more discrete sets of permitted, prohibited, or other categories of spatiotemporal representations of movements.

6. The method of claim 1, wherein the human movement model defines one or more continuous probabilities of spatiotemporal representations of movements.

7. The method of claim 1, wherein the human movement model has a temporal dependence that determines the NDOF spatiotemporal representations at a current time or iteration based at least partially on the NDOF spatiotemporal representations from one or more previous times or iterations.

8. The method of claim 1, wherein the human movement model comprises multiple body-part specific sub-models that are interrelated to predict the joint probability based on additional probabilities defining a combinations of movements of the multiple body-parts.

9. The method of claim 1, wherein the human movement model is specific to one or more parameters selected from a group consisting of: user identity, age, gender, height, weight, flexibility, movement style, activity, and character.

10. The method of claim 1, wherein the human movement model comprises one or more data structures selected from a group consisting of: a neural network that is trained based on a training dataset of real or simulated human movements, an nth-order polynomial, a human avatar, a Hidden Markov model that defines human motions as states with a probability of remaining in each state or transitioning to connected states, a Gaussian Mixture model that defines human motions as a distribution of a weighted sum of a set of N-dimensional Gaussians representing NDOF spatiotemporal representations, a sparse dictionary model comprising a dictionary of building blocks of component motions, and a movement language model that defines basic human motions that are composed into more complex human motions.

11. The method of claim 1 comprising generating the human motion model based on recordings of real human motion or a computer model of human motion.

12. The method of claim 1, wherein the human movement model represents the joint probability by additional probabilities associating at least one of: position, orientation, speed, and acceleration or rotational components thereof in a present or future time, based on at least one of: position, orientation, speed, and acceleration or rotational components thereof in a past or present time.

13. The method of claim 1, wherein the one or more movement recorders are selected from a group consisting of: an inertial measurement unit (IMU), a gaze detector, a head-mounted tracking system, a hand-mounted tracking system, an external tracking system, and an image capturing device.

14. The method of claim 1, wherein the NDOF spatiotemporal representations is a fusion of data recorded from a plurality of different types of movement recorders.

15. A system for estimating movement based on a human movement model in a virtual, augmented or mixed reality environment, the system comprising:

one or more memories to store the human movement model assigning a non-uniform probability of spatiotemporal representations of a plurality of movements corresponding to a non-uniform probability that the plurality of movements occur in a human body; and one or more processors to:

receive, from one or more movement recorders, movement recordings measuring movements of a user, estimate one or more movements of the user represented by spatiotemporal representations of a plurality of (N) degrees of freedom (DOF) that maximize a joint probability comprising a first probability that the measured movements match the estimated movements and a second probability that the human movement model assigns to the spatiotemporal representations of the estimated movements, and display a virtual, augmented or mixed reality image rendered based on the NDOF spatiotemporal representations of the estimated movements.

16. The system of claim 15, wherein the one or more processors are configured to:

receive an initial spatiotemporal representation of a plurality of (N) degrees of freedom (DOF) of the estimated movement, and apply the human movement model to transform the initial NDOF spatiotemporal representations to an updated NDOF spatiotemporal representations of the estimated movement.

17. The system of claim 15, wherein the one or more processors are configured to, in a model training phase:

receive a training dataset of movement recordings of one or more users, and train the human movement model to define the non-uniform probability of spatiotemporal representations of the plurality of movements based on a non-uniform distribution of instances of the plurality of movements detected in the training dataset.

18. The system of claim 15, wherein the one or more processors are configured to apply the human movement model to predict, based on a movement recorded at a current time, a movement estimated to occur at a future time.

19. The system of claim 15 comprising the one or more movement recorders selected from a group consisting of: an inertial measurement unit (IMU), a gaze detector, a head-mounted tracking system, a hand-mounted tracking system, an external tracking system, and an image capturing device.

20. The system of claim 15, wherein the one or more processors are configured to estimate the NDOF spatiotemporal representations as a fusion of data recorded from a plurality of different types of movement recorders.

* * * * *